United States Patent [19]
Derbyshire

[11] 3,992,020
[45] Nov. 16, 1976

[54] DRILL CHUCKS

[75] Inventor: George Cecil Derbyshire, Sheffield, England

[73] Assignee: The Jacobs Manufacturing Co., Ltd., Sheffield, England

[22] Filed: Jan. 30, 1975

[21] Appl. No.: 545,596

[52] U.S. Cl. ................................ 279/16; 279/60; 279/61
[51] Int. Cl.² ...................................... B23B 31/12
[58] Field of Search ............... 279/1 J, 1 L, 16, 17, 279/18, 57, 58, 59, 60, 61, 62, 63

[56] References Cited
UNITED STATES PATENTS

| | | | |
|---|---|---|---|
| 516,775 | 3/1894 | Small | 279/16 |
| 2,475,385 | 7/1949 | Frisco | 279/16 |
| 2,475,386 | 7/1949 | Frisco | 279/16 |
| 2,621,054 | 12/1952 | Kasimir | 279/61 |

FOREIGN PATENTS OR APPLICATIONS

| | | | |
|---|---|---|---|
| 882,943 | 8/1949 | Germany | 279/60 |
| 19,437 | 8/1913 | United Kingdom | 279/60 |

*Primary Examiner*—Othell M. Simpson
*Assistant Examiner*—W. R. Briggs
*Attorney, Agent, or Firm*—Stephen J. Rudy

[57] ABSTRACT

A drill chuck having converging slidable jaws which are extendible and retractible relative to the body of the chuck by means of a key operable bevel gear part and an associated nut rotatable relative to the body, together with a driving component for the chuck for detachably mounting the chuck to the spindle of a power tool, and further provided with means for producing a self-centering action between the body part and the driving component. Various modifications of the components of the chuck, particularly the nut, bevel gear part, driving component and the self-centering means are also disclosed.

13 Claims, 15 Drawing Figures

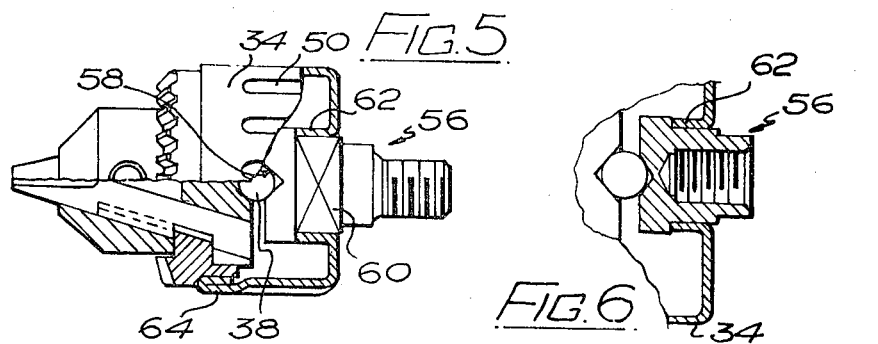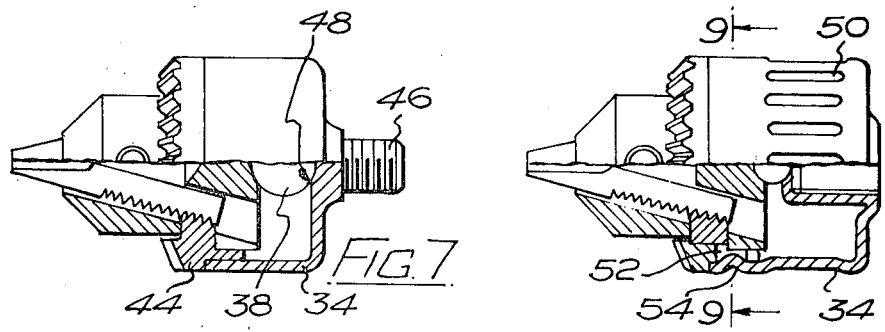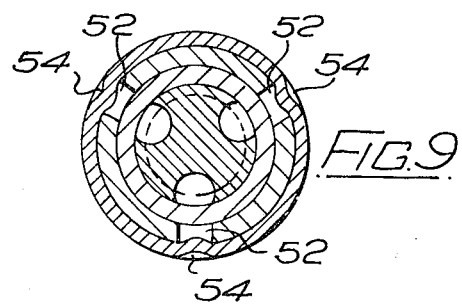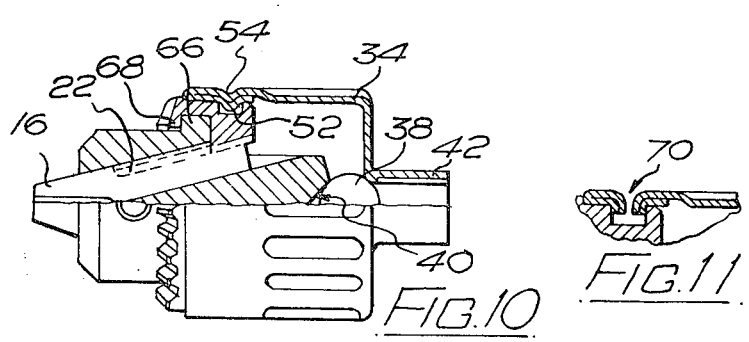

DRILL CHUCKS

BACKGROUND OF THE INVENTION

The invention relates to drill chucks of the kind including a body part in which jaws are slidably mounted in respective guides and which generally require very careful and rigidly strict inspection during or immediately following manufacture to ensure that a drill bit gripped between the jaws will rotate with almost perfect truth, that is to say within acceptable limits of inaccuracy. If a drill bit does not rotate with almost perfect truth, it will produce oversize holes and this is a particular problem when drilling holes to receive plastics or fibre wall plugs (especially with a hand held drill) since adequate tightening of the plugs in such holes may not then be possible, hence the need for very careful and rigidly strict inspection of the drill chucks. Such inspection is itself expensive and of course results in some of the finished chucks being rejected so that they must be stripped down again for their component parts to be used in other chucks. (It will be understood that unacceptable inaccuracy wll usually result from a build-up of tolerances on the component parts so that the re-assembly of the component parts in other chucks will frequently cure the trouble. Nevertheless the work involved is expensive and increases the cost of production per chuck sold). The object of the invention is at least to alleviate this present difficulty and to reduce the necessity for inspection as much as possible.

According to the invention, there is provided a drill chuck including a body part in which jaws are slidably mounted in respective guides, a bevel gear element associated with a nut rotatably mounted on the body part and having screwthreaded engagement with the jaws, said bevel gear element being capable of being engaged by the teeth of a chuck key having a pilotend which can be received in bores extending radially of the body part; and mounting means provided on a further part for connecting the chuck to a power driving spindle, means being provided for producing a self-centering action between the body part and said further part when drilling. The means provided for producing a self-centering action between the body part and the further part provided with mounting means for connecting the chuck to a power tool driving spindle may take the form of a steel ball located at the axis of the chuck between the two parts, in seatings formed in said two parts. Alternatively, such means may take the form of a domed portion formed on one of said parts at the axis of the chuck and arranged to engage a seating in the other part. A cylindrical or generally cylindrical sleeve may extend rearwards of the body part and may form at least a part of the further part provided with mounting means for connecting the chuck to a power tool driving spindle. Said sleeve may be provided at one end with the mounting means for connecting the chuck to a power tool driving spindle and be connected at its outer end to the bevel gear element associated with the nut rotatably mounted on the body part and having screwthreaded engagement with the jaws, the arrangement being such that torque applied to the chuck from the power tool driving spindle when drilling tends to rotate the nut relative to the body part to tighten the jaws.

BRIEF DESCRIPTION OF THE DRAWINGS

In order that the invention may be fully understood and readily carried into effect, the same will now be described, by way of example only, with reference to the accompanying drawings, of which:

FIGS. 2 to 15 are views which illustrate possible modifications thereof.

DESCRIPTION OF PREFERRED EMBODIMENT

Figure 1:
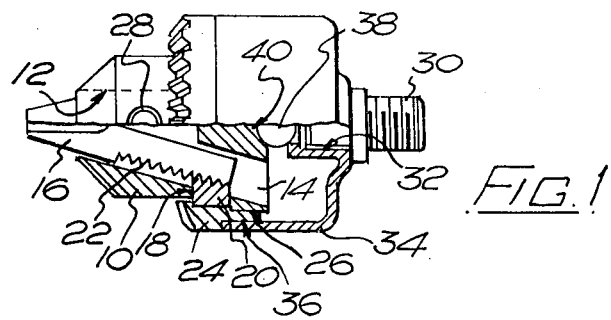
FIG. 1 is a side view partly in longitudinal section, of a drill chuck embodying the invention.

Referring now to FIG. 1 of the drawings, there is illustrated a drill chuck including a body part 10 having at one end an axially extending bore 12 for the reception of a drill shank (not shown). Three equally spaced bores 14, only one of which is shown in the drawing, diverge from the axially extending bore for the reception of resective jaws 16, the jaws being slidably mounted in the bores 14 so that as they are advanced they converge to grip a drill shank between parallel end portions and when they are retracted into the body part they release the shank. A circumferential groove 18 extends around the body part near its other end and breaks into the bores 14. A nut 20, formed in halves, engages said groove so that its tapering internal thread engages thread elements 22 which are formed on the jaws. A bevel gear element 24, formed as an unbroken ring, encircles the nut to hold it together, and in fact it is an interference fit on said nut so that it can transmit drive to the latter. The bevel gear element also registers rotatably, with slight clearance, on a clindrical portion 26 of the body part which thus acts as a device for limiting the out of truth when the chuck gripping a drill is running free from a work piece.

The bevel gear element 24 surrounds a cylindrical portion of the body part in which three equally spaced radial blind bores 28 are formed, the latter being provided for the reception of a pilot end of a chuck key (not shown) having a bevel pinion capable of engaging the teeth of the bevel gear element. In this way, the chuck jaws can be simultaneously advanced or retracted, as required, in known manner.

Means whereby the chuck can be secured to a power tool driving spindle are constituted by an internally screwthreaded bore 32 formed at one end of a cylindrical driving sleeve 34, a double ended screwthreaded adaptor 30 having been fitted into aid screwthreaded bore as shown. The cylindrical driving sleeve, which is formed as a metal pressing, is nonrotatably secured at its other end to the bevel gear element 24 on a stepped portion 36 of which it is a tight press fit. Its outside diameter is the same as that of the bevel gear element. An inturned portion of the metal pressing has conveniently provided a plain bore which has subsequently been tapped to form the screwthreaded bore 32 in which the adaptor 30 has been fitted. Said inturned portion of the metal pressing has also provided a seating for a steel ball 38 a further seating for which has been formed by a dimple 40 at the axis of the body part. (The seating for the steel ball at the end of the inturned portion of the driving sleeve can be considered to be a seating in an end wall of said sleeve. Similarly, if for example the end of the adaptor 30 was dimpled to act as a seating for the steel ball instead of the inturned portion of the driving sleeve this also could be considered to be a seating in an end wall of said sleeve).

The arrangement is such that when torque is applied to the chuck from a power tool driving spindle, this is transmitted through the driving sleeve and through the bevel gear element 24. Consequently, the driving torque tends to rotate the nut relative to the body part and thus to tighten the jaws upon the shank of the drill being used. The greater the torque and the greater is the applied tightening force so that the drill is very unlikely to slip relative to the jaws. Furthermore, the steel ball 38 provides a means whereby end thrust is transmitted to the body part when drilling, and provides a self-centering action of the driving sleeve relative to the body part.

It has been found that the provision of means for producing a self-centering action between the body part and the driving sleeve when drilling is a very important feature of the chuck just described and that by these means there is provided a chuck which will automatically operate within very close limits of perfect truth. Consequently, it is possible to reduce considerably the amount of inspection during manufacture of the chucks and also to reduce the number of chucks which are found to be outside acceptable limits of inaccuracy.

DESCRIPTION OF MODIFICATIONS FIGS. 2–15

Various modifications may be made without departing from the scope of the invention. For example, in FIG. 2 there is illustrated a drill chuck which is identical to that just described except that the screwthreaded adaptor 30 has been omitted so that the internally screwthreaded bore 32 formed at the end of the cylindrical driving sleeve 34 is able to be connected to a similarly screwthreaded spigot portion of a power tool driving spindle.

Figure 3:
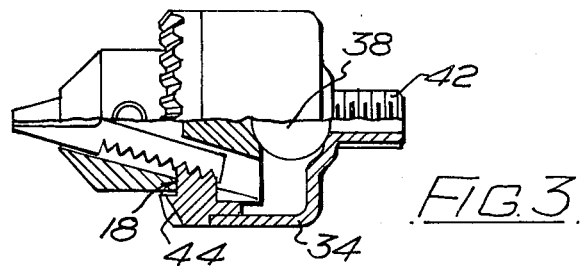

In FIG. 3 there is illustrated a drill chuck which is basically the same as that previously described with reference to FIG. 1 except that in this case the cylindrical sleeve is formed as a metal pressing with a drawn portion 42 the outside diameter of which has been screwthreaded so that the adaptor 30 is not required. A large diameter steel ball 38 is used to make up the distance between the body part and the end wall of the driving sleeve. In addition, the nut and bevel gear element are shown to be formed as an integral part 44 (but made in halves of course so that the nut can be engaged in the groove 18). In this case therefore the driving sleeve 34 serves to hold the assembled halves of the integral part 44 together.

Figure 4:
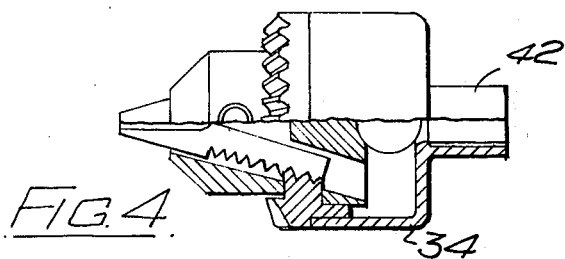

In FIG. 4 there is illustrated a drill chuck identical to that just described with reference to FIG. 3 except that the drawn portion 42 of the cylindrical sleeve 34 has been internally screwthreaded instead of externally screwthreaded. In this way the chuck has been adapted for connection to a screwthreaded spigot portion of a power tool driving spindle.

Referring now to FIG. 5, there is illustrated a drill chucks similar to that described with reference to FIG. 3 except that in this case the cylindrical sleeve 34 has been formed separately from the screwthreaded portion which forms the means whereby the chuck can be secured to a power tool driving spindle. As shown, the screwthreaded portion has been formed at one end of a driving spindle element generally indicated 56 at the other end of which there is formed a dimple 58 for the seating of the steel ball 38. Intermediate its ends the driving spindle element is formed with a square section portion 60 with which a completely inturned flange portion 62 of the sleeve 34, defining a square aperture, is engaged to form a driving connection between the driving spindle and sleeve. The sleeve has in this case been formed as a pressing from relatively light gauge metal plate and substantial strength has been imparted to it at its end which encircles the assembled halves of the integral nut and bevel gear element by forming it with a completely turned under edge 64. The tight fit of the turned under end of the sleeve upon the integral nut and bevel gear element provides the only driving connection between the two. In addition the sleeve has been formed with a series of flutes 50 which further strengthen the light gauge wall of said sleeve.

In a modified form of this chuck, as illustrated in FIG. 6, the driving spindle element 56 is provided with a screwthreaded bore instead of a screwthreaded spigot portion. A further modification which could be made is that the noncircular driving portion of the driving spindle element, and the flange portion 62 of the sleeve which must be of complementary shape, need not necessarily be of square form but could for example be hexagonal or could be circular with a pair of oppositely disposed flats.

In FIG. 7 there is illustrated a drill chuck similar to that described with reference to FIG. 3, in the sense that the nut and bevel gear are formed as an integral part 44, but the cylindrical sleeve 34 has been formed as a light forging and subsequently machined. It has been formed with a projecting spigot portion 46 which has been screwthreaded for connection to a power tool driving spindle. The end wall of the cylindrical driving sleeve has been dimpled at 48 to provide a seating for the steel ball 38.

Figure 2:
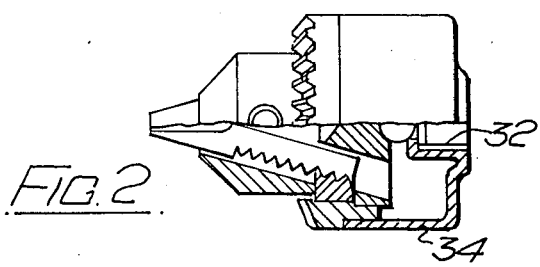

In FIGS. 8 and 9 there is illustrated a drill chuck basically similar to those illustrated in FIGS. 1 and 2 except that, as in the case of the chuck illustrated in FIGS. 5 and 6, the cylindrical driving sleeve 34 is provided with a plurality of closely spaced axially extending corrugations of flutes 50 which add a degree of strength to the sleeve. In addition, the stepped portion 36 of the bevel gear element has been provided with three equally spaced radial holes 52 and the driving sleeve has complementary dimples 54 which project with slight clearance into said holes to provide a driving connection between the sleeve and the bevel gear element. (Of course, instead of being provided with dimples which project with slight clearance into the radial holes in the bevel gear element the driving sleeve could be provided with inwardly extending driving pegs or dowels for that purpose).

Referring now to FIG. 10, in a rather different form of chuck embodying the invention, the body part is provided intermediate its ends with a circumferential flange 66 and an integral nut and bevel gear element 68, formed in halves, surrounds said flange and is located axially by it. The tapering internal thread of the nut engages the thread elements 22 which are formed on the jaws 16 and a steel ball 38 is provided as in the previously described embodiments, said ball being located in a seating formed by a dimple 40 at the axis of the body part and in the seating formed in the end wall of the cylindrical driving sleeve 34 where it joins the integral drawn portion 42 which in this case is shown to be internally screwthreaded.

However, in this case, although the sleeve has been formed with a completely turned under edge at its end which encircles the assembled halves of the integrally formed nut and bevel gear element 68, so that at that end it has substantial strength with which to hold the halves of said element together, drive to the latter is transmitted from the sleeve 34 by way of three equally spaced dimpled portions 54 in said sleeve which engage radial holes 52 in the skirt portion of the nut.

In a minor modification of the chuck just described, the sleeve has been provided with small holes 70, as shown in FIG. 11, which have facilitated the displacement of metal into the radial holes in the skirt portion of the nut to form a driving connection thereto.

Figure 12:
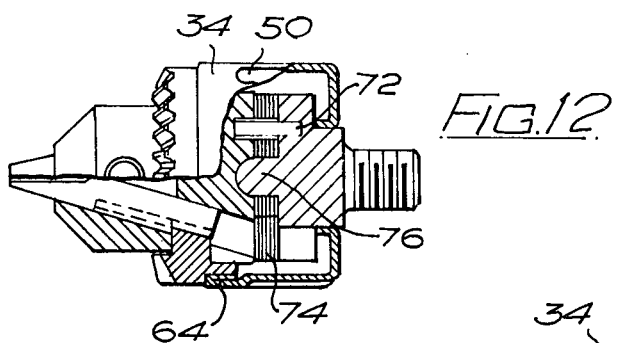

In FIG. 12 there is illustrated a construction of chuck in some ways similar to that described with reference to FIG. 5 in the sense that the cylindrical sleeve 34 has been formed separately from the driving spindle element generally indicated 56 and in that said sleeve has been formed as a light metal pressing with flutes 50 and a completely turned under edge 64. However, in this case the completely inturned flange portion defines a circular aperture and encircles a circular portion of the driving spindle element. A driving connection is established directly between the element 56 and the body part 10 by means of a plurality of pins 72 which are tightly fitted in holes in the driving spindle element and extend into clearance holes in the body part. In addition, a rubber disc 74 is disposed between the body part and said driving spindle element. A further point of difference resides in the fact that the steel ball has been omitted and the means provided for producing a self-centering action between the body part and the driving spindle element take the form of a domed portion 76 which has been formed integrally on the driving spindle element and which engages the seating formed by the dimple 40 in the body part.

Figure 13:
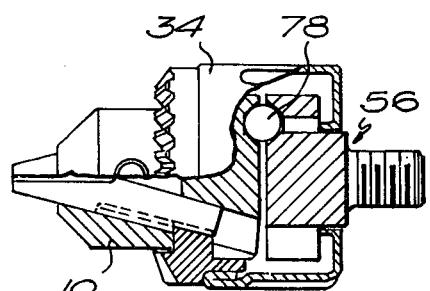

In FIG. 13 there is illustrated a construction in which three steel balls 78 are located between the body part 10 and the driving spindle element in respective seatings equally spaced on common pitch circle diameters. The three steel balls produce the self-centering action when drilling and also constitute a driving connection between the driving spindle element and the body part. The sleeve 34 acts upon the body part and the driving spindle element so that they grip the steel balls between them.

Figure 14:
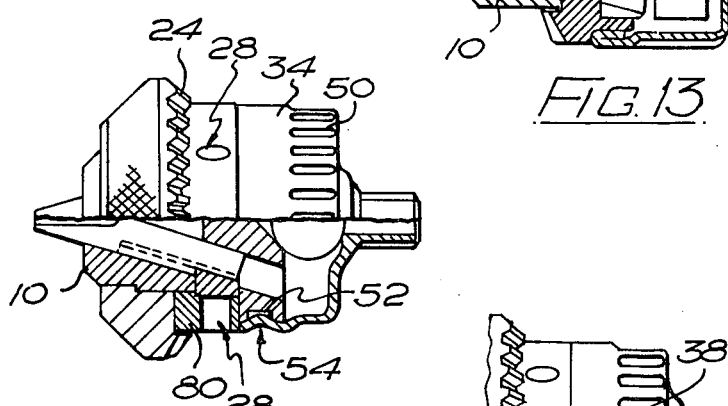

Referring now to FIG. 14, in a further rather different form of chuck embodying the invention, the nut 20, formed in halves, is encircled by a ring element 80 in which the radial bores 28 (for reception of the pilot end of a chuck key) have been formed. The ring element is rotatable upon the body part but is a tight fit upon the nut so that it can transmit drive thereto. The bevel gear element in this case has been formed as a ring or collar press fitted on the body part so that it can be considered to be formed integrally with said body part. In other respects the chuck can be considered to be rather similar to that described with reference to FIG. 10 in the sense that the cylindrical or generally cylindrical sleeve 34 has been formed as a light metal pressing with flutes 50 which strengthen its walls and in that a drawn portion of the sleeve has been screwthreaded. A driving connection between the sleeve and the body part is formed by dimpled portions 54 of the sleeve engaging radial holes 52 in the body part.

Figure 15:
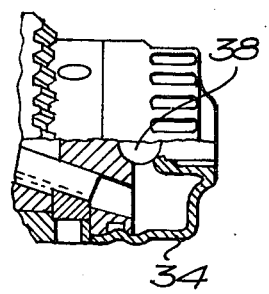

A minor modification of the chuck just described is shown in FIG. 15 in which the sleeve 34 is shown to have been inturned so that it has provided a seating for the steel ball 38. The inturned portion has been screwthreaded for connection to a similarly screwthreaded spigot portion of a power tool driving spindle or for the reception of a screwthreaded adaptor.

Thus it will be seen that in each of the modified constructions there is obtained the same advantages as in the construction described with reference to FIG. 1, that is to say, the steel ball or domed portion as the case may be in each case provides a means whereby end thrust is transmitted to the body part when drilling and provides the self-centering action. However, it will be understood that the various features of the chucks described may be interchanged. That is to say, for example, any one of the chucks illustrated in FIGS. 1 to 13 may have separate nut and bevel gear elements or may alternatively have nut and bevel gear elements of integral construction.

In each of the embodiments described and illustrated the cylindrical driving sleeve has been said to be made of metal. However, the sleeve could quite well be made at least in part of a synthetic plastics material in which case it would probably be necessary to provide it, at its end which is connected to the bevel gear element or body part, as the case may be, with a reinforcing member in the form of a sreel band moulded into the sleeve. It will probably also be necessary either to increase the diameter of the screwthreaded spigot or bore by which it is to be connected to a power tool driving spindle or to form said spigot or bore on or in a metal insert moulded into the sleeve. It may be found that in those constructions in which drive is transmitted through the sleeve, whatever material the sleeve is made from, some additional fixing of the sleeve to the bevel gear element or body part, as the case may be, is necessary, for example by the introduction of driving lugs and/or by the use of fixing pins between the two. A suitable adhesive may well be used to further secure the two components together. Although it is obviously preferable that the outside diameter of the cylindrical driving sleeve should be the same as that of the bevel gear element so as to provide a smooth surface, this is not essential. The driving sleeve may well have an outside diameter larger than said gear element, that is to say, the bevel gear element need not necessarily be provided with a stepped portion for the reception of the driving sleeve; the latter could be a press fit on the outside diameter of the bevel gear element.

I claim:

1. A drill chuck including a body part in which jaws are slidably mounted in respective converging guides, a nut rotatably mounted on the body part in an annular groove and having screwthreaded engagement with the jaws, a bevel gear fixed about the nut and adapted to be engaged by the teeth of a chuck key having a pilot end receivable in a radial bore of the body part, a mounting part separate from the body part for connecting the chuck to a driving spindle, a sleeve extension of the mounting part drivingly engaged with the periphery of bevel gear element, and ball means seated in part in the mounting part and in part in the body part adapted for producing a self-centering action of the body part relative to the mounting part under end thrust transmitted from the mounting part to the body part during use of the chuck in a drilling operation.

2. A drill chuck according to claim 1, wherein the mounting part has a non-circular portion, and the sleeve extension has a complementary non-circular aperture defined by an inturned flange portion of the sleeve extension with which the non-circular portion defines a driving connection.

3. A drill chuck according to claim 1, wherein the bevel gear and the nut comprises two half sections arranged in ring form, each half section comprising a nut portion integral with a bevel gear portion, and the driving connection of the sleeve extension with the bevel gear is defined by a press fit of the sleeve extension about the two half sections holding them in said ring form.

4. A drill chuck according to claim 1, in which the driving connection between the sleeve extension and the bevel gear is defined by a plurality of dimpled portions in the sleeve extension and complementary radial holes in the bevel gear in which the dimpled portions are engaged.

5. A drill chuck according to claim 4, in which the sleeve extension is provided with an axially extending inturned screwthreaded portion defining the mounting part, the inner end of said inturned portion forming a seating in which the ball means is seated in part.

6. A drill chuck according to claim 1, in which the means provided for producing a self-centering action between the body part and the further part provided with mounting means for connecting the chuck to a power tool driving spindle take the form of a domed portion formed on one of said parts at the axis of the chuck and arranged to engage a seating in the other part.

7. A drill chuck according to claim 1, in which a disc of elastomeric material is disposed between the body part and the further part provided with mounting means for connecting the chuck to a power tool driving spindle.

8. A drill chuck according to claim 7, in which a driving connection between the body part and the further part provided with mounting means for connecting the chuck to a power tool driving spindle is constituted by a plurality of pins which are fixed in one of said parts and extend into clearance holes in the other of said parts so that the self-centering action between the two parts can take place when drilling.

9. A drill chuck according to claim 1, in which the means provided for producing a self-centering action between the body part and the further part provided with mounting means for connecting the chuck to a power tool driving spindle take the form of at least three steel balls located between the two parts, in respective seatings formed in said two parts, said seatings being equally spaced on common pitch circle diameters.

10. A drill chuck according to claim 1, in which a driving connection between the sleeve and the nut is effected by the press fitting or by the fixing by an adhesive of the sleeve on the bevel gear element associated with said nut.

11. A drill chuck including a body part in which jaws are slidably mounted in respective converging guides, a nut rotatably disposed in an annular groove in the body part having screwthreaded engagement with the jaws, a bevel gear element fixed to the nut, the bevel gear element being capable of being engaged by the teeth of a chuck key having a pilot end receivable in radial bores in the body part, mounting means provided on a further part for connecting the chuck to the spindle of a driving tool, means for producing a self-centering action between the body part and the further part having the form of a steel ball located at the axis of the chuck between the two parts in seatings formed in said two parts, and a cylindrical sleeve extending rearwardly of the body part, the sleeve being provided at its rear end with the mounting means and being connected at its forward end to the bevel gear element so that torque applied to the mounting means tends to rotate the nut relative to the body part to tighten the jaws, in which a driving connection between the sleeve and the nut is effected by the provision of a plurality of dimpled portions in the sleeve and complementary radial holes in the bevel gear element, said dimpled portions being received in said holes.

12. A drill chuck according to claim 11, in which the nut is formed in halves and is held together by the bevel gear element which is formed as an unbroken ring.

13. A drill chuck according to claim 11, in which the bevel gear element and the nut comprises two half sections encircled and held together in ring form by the forward end of the sleeve, each half section comprising a nut portion integral with a bevel gear element portion, the half sections serving to facilitate assembly of the latter into the annular groove in the body part.

* * * * *